United States Patent [19]

Umemoto et al.

[11] Patent Number: 4,639,384

[45] Date of Patent: Jan. 27, 1987

[54] METHOD OF CASTING URETHANE ELASTOMER ON METAL

[75] Inventors: Sumio Umemoto; Eiichi Hattori; Ryutaro Kamakari, all of Osaka, Japan

[73] Assignee: The Toyo Rubber Industry Co., Ltd., Osaka, Japan

[21] Appl. No.: 822,808

[22] Filed: Jan. 27, 1986

[30] Foreign Application Priority Data

Jan. 28, 1985 [JP] Japan .................................. 60-14968

[51] Int. Cl.⁴ .......................... B05D 5/00; B05D 3/12; B32B 31/00
[52] U.S. Cl. .................................... 427/290; 156/242; 156/245; 156/153; 156/299; 427/307; 427/409
[58] Field of Search ...................... 427/409, 407.1, 289, 427/290, 307; 156/242, 245, 299, 300, 153

[56] References Cited

U.S. PATENT DOCUMENTS

| | | | |
|---|---|---|---|
| 4,199,489 | 4/1980 | Short | 528/58 |
| 4,391,858 | 7/1983 | Batzill | 427/407.1 |
| 4,489,135 | 12/1984 | Drexler et al. | 428/423 L |
| 4,499,143 | 2/1985 | Panush | 427/409 X |
| 4,508,767 | 4/1985 | Hokamura et al. | 427/407.1 |
| 4,551,387 | 11/1985 | Manabe et al. | 427/409 X |

FOREIGN PATENT DOCUMENTS 2528943 12/1976 Fed. Rep. of Germany .

Primary Examiner—Thurman K. Page
Attorney, Agent, or Firm—Oblon, Fisher, Spivak, McClelland, & Maier

[57] ABSTRACT

A method for adhering an urethane elastomer to a metal is disclosed, and comprises applying a thermosetting resin containing a flaky inorganic filler to a surface of a metal matrix, curing the thermosetting resin layer, applying an isocyanate-terminated prepolymer thereon, curing the prepolymer layer, and casting an urethane elastomer stock solution over the cured laminate. The adhesion obtained is excellent in durability against acids.

13 Claims, No Drawings

METHOD OF CASTING URETHANE ELASTOMER ON METAL

FIELD OF THE INVENTION

This invention relates to a method of adhesion of an urethane elastomer used for iron making rolls or linings for various chemical equipments that are required to have excellent adhesion durability against chemicals, especially acidic liquids.

BACKGROUND OF THE INVENTION

Urethane elastomers are polymers having per se excellent chemical resistance and adhesiveness to metals. However, when they are applied to iron making rolls which are used in direct contact with an acidic aqueous solution and on which a dynamic shear is imposed, they do not withstand long-term use due to their hydrolysis as well as internal heat generation.

In order to overcome the above-described disadvantage, various attempts have been made by the use of phenolic resins excellent in heat resistance and chemical resistance or thermosetting resins, e.g., epoxy resins, as adhesives. Nevertheless, any decisive method of adhesion has not yet been established.

SUMMARY OF THE INVENTION

An object of this invention is to provide a method for adhering an urethane elastomer to a metal with excellent adhesion durability against acids, including not only inorganic acids but organic acids or mixed acids of these acids.

According to the present invention there is to provide a method for adhering an urethan elasomer to a metal, which comprises applying a thermosetting resin containing a flaky inorganic filler to a surface of a metal matrix, curing the thermosetting resin layer, applying an isocyanate-terminated prepolymer thereon, curing the prepolymer layer, and casting an urethane elastomer stock solution over the cured laminate.

DETAILED DESCRIPTION OF THE INVENTION

A metal adherend intended in the present invention is iron, but the adhesion method according to the present invention is also effectively applicable to copper, nickel, zinc, etc.

The thermosetting resin which can be used in the present invention includes epoxy resins and unsaturated polyester resins. The flaky inorganic filler which is incorporated in the thermosetting resin includes glass flakes, mica, graphite, etc. The proportion of the inorganic filler to the thermosetting resin is not particularly restricted but usually ranges from 10 to 150 parts by weight per 100 parts by weight of the thermosetting resin. Proportions less than 10 parts by weight produce only poor chemical resistance, and proportions exceeding 150 parts by weight reduce coating workability. A particle size of the flaky inorganic filler is not also particularly limited. Larger particle sizes are favorable for corrosion resistance but unfavorable for coating workability. Accordingly, the flaky inorganic filler preferably has a particle size of from 24 to 250 mesh. The thermosetting resin containing a flaky inorganic filler (hereinafter referred to as thermosetting resin composition) is suitably coated on a metal matrix to a dry thickness of from 30 to 500 $\mu$m. It is desirable to apply a commercially available primer for adhesion to metals to the metal matrix before coating with the thermosetting resin composition. Moreover, corrosion resistance can further be ensured by incorporating a flaky inorganic filler in the primer at a proportion smaller than that in the thermosetting resin composition.

The isocyanate-terminated prepolymer which is laminated on the thermosetting resin layer is prepared by reacting a known organic polyisocyanate, such as tolylene diisocyanate, diphenylmethane diisocyanate, a polyalkylene polyphenyl isocyanate, etc., with a glycol having an active hydrogen, such as propylene glycol, dipropylene glycol, polyoxypropylene triol, etc., using the isocyanate in molar excess. A preferred content of the terminal isocyanate group in the prepolymer is in the range of from 2 to 15% by weight. It is necessary that the isocyanate-terminated prepolymer should be coated after curing of the above-described thermosetting resin layer. The prepolymer is suitably applied to a dry thickness of from 30 to 500 $\mu$m.

It is preferable that the cured surface of the thermosetting resin layer be roughened, for example, with a sandblast or sandpaper prior to the application of the isocyanate-terminated prepolymer.

The present invention comprises casting an urethane elastomer stock solution over the above-described laminate of two layers. In addition, adhesive strength between the urethane elastomer and a metal matrix can further be improved by providing an intermediate layer composed of a mixture of (A) the thermosetting resin composition and (B) the isocyanate-terminated prepolymer between the aforesaid two layers. In this preferred embodiment, a mixing ratio of (A)/(B) in the intermediate layer preferably ranges from 30 to 70/70 to 30 by weight, and the intermediate layer is preferably coated to a dry thickness of from 10 to 100 $\mu$m.

Casting of an urethane elastomer stock solution over the cured laminate can be carried out by placing the laminate in a mold maintaining a space over the laminate surface of the metal matrix corresponding to a desired thickness of an urethane elastomer layer. For the purpose of improving release properties, the mold is desirably coated with a known release agent, e.g., silicone compounds, waxes and fluorine-containing resins. It is also recommended to preliminarily heat the laminated metal matrix together with the mold at a temperature of 80° C. or higher, and preferably of from 85° to 100° C. The preliminary heating is expected not only to accelerate molding and curing of the urethane elastomer but also to improve adhesiveness.

The urethane elastomer stock solution to be used in the present invention may be any of commercially available polytetramethylene glycols, polyesters and polyethers and can appropriately be selected depending on performance properties required.

The present invention will now be illustrated in greater detail with reference to the following examples and comparative examples, but it should be understood that the present invention is not limited thereto. In these examples, all the parts and percents are by weight unless otherwise indicated.

COMPARATIVE EXAMPLE 1

A primer composition comprising 100 parts of a vinyl ester type unsaturated polyester resin, 30 parts of glass flakes, 0.5 part of cobalt naphthenate (6%) and 1 part of methyl ethyl ketone peroxide was coated on a sandblasted flat plate of structural steel (JIS SS-41) having a thickness of 2.54 mm, a width of 25.4 mm and a length of 60 mm to a dry thickness of about 30 μm. After curing the primer, a thermosetting resin composition having the same composition as used above but containing 60 parts of glass flakes was coated on the cured primer to a dry thickness of 130 μm. The resin layer was allowed to stand at room temperature for 24 hours to effect curing. Structural steel (SS-41) flat plates were assembled into a frame so that an urethane elastomer layer might be on the cured laminated side of the metal having a thickness of 5 mm, and a polytetramethylene glycol type urethane elastomer stock solution (Uniprene T-90, manufactured by Toyo Rubber Industry Co., Ltd.) was casted in the frame, followed by curing. After aging of the urethane elastomer, the adhesive strength between structural steel matrix and the urethane elastomer was determined in accordance with the method specified in Japanese Industrial Standard JIS K6301-Aug. 3, 1975.

COMPARATIVE EXAMPLES 2 AND 3

Adhesion was carried out in the same manner as described in Comparative Example 1 except that the thickness of the thermosetting resin layer was changed to 100 μm and that a phenolic resin layer (Chemrock K-218, manufactured by Hughson Chemical Co., Ltd.) or an epoxy resin layer (Thixon 402/403/406, manufactured by Dayton Chem. Products Lab.) having a thickness of 100 μm was further provided on the cured thermosetting resin layer before adhesion. The adhesive strength as determined in the same manner as in Comparative Example 1 is shown in Table 1.

COMPARATIVE EXAMPLE 4

Adhesion was carried out in the same manner as described in Comparative Example 2 or 3 except that the phenolic resin or epoxy resin layer was replaced by a 1:1 (by weight) mixed intermediate layer comprising an isocyanate-terminated prepolymer (NCO content: 3.4%) which was obtained by reacting 1 mole of propylene glycol and 1.3 mole of diphenylmethane diisocyanate and a thermosetting resin composition having the same composition as used in Comparative Example 1 (flaky inorganic filler content: 60 parts per 100 parts of the thermosetting resin), in which the isocyanate-terminated prepolymer as prepared above was used as diluted with 1.5 times the volume of methyl isobutyl ketone (hereinafter the same). The adhesive strength as determined in the same manner as in Comparative Example 1 is shown in Table 1.

EXAMPLE 1

Adhesion was carried out in the same manner as described in Comparative Example 4 but replacing the mixed intermediate layer with a 60 μm thick layer solely comprising the isocyanate-terminated prepolymer as used in Comparative Example 4. The adhesive strength as determined in the same manner as in Comparative Example 1 is shown in Table 1.

EXAMPLES 2 AND 3

Adhesion was carried out in the same manner as in Comparative Example 4 except that the thickness of the mixed intermediate layer was changed to 50 μm and the isocyanate-terminated prepolymer as used in Comparative Example 4 was further applied on the cured mixed intermediate layer (Example 2) or that the thus prepared laminate sample of Example 2 was preliminarily heated at 115° C. for 3 hours (Example 3) prior to casting of the urethane elastomer. The adhesive strength as determined in the same manner as in Comparative Example 1 is shown in Table 1.

TABLE 1

|  | Comparative Example No. | | | | Example No. | | |
| --- | --- | --- | --- | --- | --- | --- | --- |
|  | 1 | 2 | 3 | 4 | 1 | 2 | 3 |
| Thickness (μm) of Thermosetting Resin (A) Layer | 130 | 100 | 100 | 100 | 100 | 60 | 60 |
| Thickness (μm) of Mixed Intermediate Layer (A/B = 1:1) | — | — | — | 100 | — | 50 | 50 |
| Thickness (μm) of NCO Prepolymer (B) Layer | — | — | — | — | 60 | 60 | 60 |
| Thickness (μm) of Phenolic Resin Layer | — | 100 | — | — | — | — | — |
| Thickness (μm) of Epoxy Resin Layer | — | — | 100 | — | — | — | — |
| Preliminary Heating Before Casting | — | — | — | — | — | — | 115° C. × 3 hrs. |
| Adhesive Strength (Kg/cm$^2$) | 13.3 | 14.0 | 0 | 18.0 | 36.0 | 42.0 | 42.5 |

EXAMPLE 4

Each of the urethane elastomer-adhered laminate samples obtained in Comparative Example 2 and Examples 1 and 2 was immersed in sulfuric acid, hydrochloric acid, acetic acid, citric acid or a mixed acid of these four acids under the respective temperature condition as indicated in Table 2 below for the indicated period of time.

Acid resistance of the sample was visually evaluated according to the following standards.

Acid Resistance

⊚: No abnormality observed
○ : Slight color change observed
△: Partial peeling observed
X: Remarkable peeling observed The immersion test results obtained are shown in Table 2.

TABLE 2

| Acid (Temperature: °C.) | Comparative Example 2 | | | Example 1 | | | Example 2 | | |
|---|---|---|---|---|---|---|---|---|---|
| | 3 Days | 8 Days | 14 Days | 3 Days | 8 Days | 14 Days | 3 Days | 8 Days | 14 Days |
| Sulfuric Acid[1] (60° C.) | ◉ | ◉ | ◉ | ◉ | ◉ | ◉ | ◉ | ◉ | ◉ |
| Hydrochloric Acid[2] (60° C.) | ◉ | Δ | Δ | ◉ | Δ | Δ | ◉ | ◉ | O |
| Acetic Acid[3] (22° C.) | ◉ | Δ | Δ | ◉ | ◉ | Δ | ◉ | ◉ | ◉ |
| Acetic Acid[3] (60° C.) | X | X | X | Δ | Δ | X | ◉ | O | Δ |
| Citric Acid[4] (60° C.) | ◉ | O~◉ | X | ◉ | O~◉ | Δ | ◉ | ◉ | O |
| Mixed Acid[5] (60° C.) | X | X | X | Δ | Δ | X | ◉ | O | O |

Note:
[1]50 g of concentrated sulfuric acid diluted with 1 liter of water
[2]30 g of concentrated hydrochloric acid diluted with 1 liter of water
[3]30 g of glacial acetic acid dissolved in 1 liter of water
[4]30 g of citric acid dissolved in 1 liter of water
[5]Mixture of equal weights of the acids [1] to [4]

It can be seen from the results of Tables 1 and 2 that a statical adhesive strength can be improved and also adhesion durability against an organic acid or a mixture of an organic acid and an inorganic acid can be extended at least 4 times by providing a thermosetting resin layer containing a flaky inorganic filler adjacent or near to the metal matrix and providing an isocyanate-terminated prepolymer layer adjacent to an urethane elastomer.

Thus, the present invention provides a method for adhering an urethane elastomer to a metal, which offers an extremely high industrial value in the field requiring acid resistance, such as iron making rolls and linings for various chemical equipments.

While the invention has been described in detail and with reference to specific embodiments thereof, it will be apparent to one skilled in the art that various changes and modifications can be made therein without departing from the spirit and scope thereof.

What is claimed is:

1. A method for adhering an urethane elastomer to a metal which comprises applying a thermosetting resin containing a flaky inorganic filler to a surface of a metal matrix, curing the thermosetting resin layer, applying an isocyanate-terminated prepolymer thereon, curing the prepolymer layer, and casting an urethane elastomer stock solution over the cured laminate.

2. A method as in claim 1, wherein said flaky inorganic filler is present in an amount of from 10 to 150 parts by weight per 100 parts by weight of the thermosetting resin.

3. A method as in claim 1, wherein said thermosetting resin containing a flaky inorganic filler is applied to a dry thickness of from 30 to 500 μm.

4. A method as in claim 1, wherein said isocyanate-terminated prepolymer contains from 2 to 15% by weight of an isocyanate group.

5. A method as in claim 1, wherein said isocyanate-terminated prepolymer is applied to a dry thickness of from 30 to 500 μm.

6. A method as in claim 1, wherein said metal matrix is coated with a primer prior to the application of the thermosetting resin containing a flaky inorganic filler.

7. A method as in claim 6, wherein said primer contains a flaky inorganic filler at a proportion smaller than that in the thermosetting resin.

8. A method as in claim 1, wherein the method further comprises roughening the surface of the thermosetting resin layer prior to applying the isocyanate-terminated prepolymer.

9. A method as in claim 1, wherein the method further comprises providing an intermediate layer comprising said thermosetting resin containing a flaky inorganic filler and said isocyanate-terminated prepolymer between said thermosetting resin layer and said isocyanate-terminated prepolymer layer.

10. A method as in claim 9, wherein a mixing ratio of the thermosetting resin containing a flaky inorganic filler to the isocyanate-terminated prepolymer is 30 to 70/70 to 30 by weight.

11. A method as in claim 9, wherein said intermediate layer is applied to a dry thickness of from 10 to 100 μm.

12. A method as in claim 1, wherein the metal matrix having a cured laminate thereon is preliminarily heated to a temperature of 80° C. or higher prior to the casting.

13. A method as in claim 12, wherein the heating is to a temperature of from 85° to 100° C.

* * * * *